(12) United States Patent
Borino

(10) Patent No.: US 12,022,815 B1
(45) Date of Patent: Jul. 2, 2024

(54) SYSTEM, APPARATUS AND METHODS FOR CRAB HARVESTING

(71) Applicant: Todd Borino, Hillsboro, OR (US)

(72) Inventor: Todd Borino, Hillsboro, OR (US)

(*) Notice: Subject to any disclaimer, the term of this patent is extended or adjusted under 35 U.S.C. 154(b) by 147 days.

(21) Appl. No.: 17/133,806

(22) Filed: Dec. 24, 2020

(51) Int. Cl.
*A01K 69/08* (2006.01)
*A01K 69/06* (2006.01)

(52) U.S. Cl.
CPC ............ *A01K 69/08* (2013.01); *A01K 69/06* (2013.01)

(58) Field of Classification Search
CPC ........ A01K 69/06; A01K 69/08; A01K 69/10; A01K 79/00; A01K 99/00
USPC .............................................. 43/100, 105, 4
See application file for complete search history.

(56) References Cited

U.S. PATENT DOCUMENTS

| | | | | |
|---|---|---|---|---|
| 132,476 A * | 10/1872 | Livaudais | ............... | A01K 69/06 43/16 |
| 3,040,980 A * | 6/1962 | Mann | ...................... | G06M 7/04 250/221 |
| 3,055,139 A * | 9/1962 | Condello | ............... | A01K 69/06 43/61 |
| 3,373,523 A | 3/1968 | Olafson | | |
| 3,508,358 A * | 4/1970 | Lee | ...................... | A01M 23/20 43/60 |
| 4,141,172 A * | 2/1979 | Prosol | .................... | A01K 69/06 43/105 |
| 4,249,277 A * | 2/1981 | Plante | .................... | A01K 75/04 43/100 |
| 4,373,288 A * | 2/1983 | McCrink | ............... | A01K 69/06 43/17 |
| 4,393,617 A * | 7/1983 | Charnoske | ............ | A01M 23/26 441/6 |
| 4,406,083 A * | 9/1983 | Hart | ....................... | A01K 69/06 43/105 |
| 4,434,575 A * | 3/1984 | Pearson | ................. | A01K 69/06 43/17.1 |
| 4,445,295 A * | 5/1984 | Litrico | ................... | A01K 69/06 43/100 |
| 4,471,552 A * | 9/1984 | McIntosh | ............... | A01K 79/02 43/4.5 |
| 4,507,093 A * | 3/1985 | Norvell | ..................... | B63C 7/10 441/2 |
| 4,644,682 A | 2/1987 | Cloud | | |
| 4,649,744 A * | 3/1987 | Cotillier | ................. | A01K 79/00 73/170.34 |
| 4,831,774 A * | 5/1989 | Gonzalez | ............... | A01K 69/06 43/100 |
| 4,980,989 A * | 1/1991 | Davis | ..................... | A01K 69/06 43/100 |

(Continued)

FOREIGN PATENT DOCUMENTS

JP 4445440 B2 * 4/2010
JP 2021076567 A * 5/2021

(Continued)

*Primary Examiner* — Darren W Ark
(74) *Attorney, Agent, or Firm* — J. Evans Edmondson; EDMONDSON IP LAW

(57) ABSTRACT

An improved crab trap having a selectable counting device that actuates floatable transmitters that indicate when a certain number of crabs have entered the trap. The transmitters are connected to receivers that can determine which traps have crabs allowing the fisherman to improve and optimize the counting of crabs and pulling of crab pots.

6 Claims, 18 Drawing Sheets

(56) References Cited

U.S. PATENT DOCUMENTS

| | | | | |
|---|---|---|---|---|
| 5,005,309 A * | 4/1991 | Hall | ................ | A01K 79/02 43/4 |
| 5,133,149 A * | 7/1992 | Smyly, Sr. | ............ | A01K 69/06 43/17 |
| 5,165,174 A | 11/1992 | Brown, Jr. | | |
| 5,478,273 A | 12/1995 | Ives | | |
| 5,555,666 A * | 9/1996 | Glatzer | ................ | A01K 79/00 43/17 |
| 5,771,627 A | 6/1998 | Mattson | | |
| 6,247,264 B1 * | 6/2001 | Prosol | ................ | A01K 69/10 43/100 |
| 6,261,142 B1 * | 7/2001 | Fiotakis | ................ | B63B 22/02 441/2 |
| 6,550,180 B1 | 4/2003 | Le | | |
| 6,739,924 B1 * | 5/2004 | Groen | ................ | A01K 69/06 441/2 |
| 6,786,000 B1 * | 9/2004 | Hong | ................ | A01K 73/12 43/105 |
| 6,880,290 B2 * | 4/2005 | Mahoney | ................ | A01K 97/24 43/4.5 |
| 8,553,501 B1 * | 10/2013 | Cota | ................ | A01K 69/00 43/100 |
| 8,919,034 B2 * | 12/2014 | Alhuwaishel | ....... | A01M 31/002 43/64 |
| 8,938,908 B2 | 1/2015 | Havens | | |
| 9,091,550 B1 | 7/2015 | Smith | | |
| 10,227,112 B2 | 3/2019 | Pedersen | | |
| 10,375,940 B2 * | 8/2019 | Al-Farhan | ............ | A01K 97/12 |
| 10,881,087 B1 * | 1/2021 | Poulsen | ................ | A01K 69/00 |
| 11,122,785 B2 * | 9/2021 | Greenberg | ............ | H04B 11/00 |
| 11,147,251 B1 * | 10/2021 | Fu | ................ | A01K 81/04 |
| 11,357,219 B2 * | 6/2022 | Abedi | ................ | A01K 69/08 |
| 11,627,730 B1 * | 4/2023 | Poulsen | ................ | A01K 85/01 43/4.5 |
| 2007/0264890 A1 * | 11/2007 | Brown | ................ | A01K 69/00 441/30 |
| 2008/0271362 A1 * | 11/2008 | Mikhail | ................ | A01K 69/06 43/100 |
| 2011/0094146 A1 * | 4/2011 | Hails | ................ | A01K 93/02 43/43.15 |
| 2013/0109259 A1 * | 5/2013 | Abulrassoul | ........... | A01K 69/06 441/11 |
| 2014/0305026 A1 | 10/2014 | Pemberton | | |
| 2016/0340001 A1 | 11/2016 | Welch | | |
| 2017/0332612 A1 * | 11/2017 | Partan | ................ | A01K 69/08 |
| 2018/0244354 A1 * | 8/2018 | Opshaug | ................ | A01K 75/04 |
| 2021/0244005 A1 * | 8/2021 | Sinclair | ................ | B63B 35/44 |
| 2022/0132819 A1 * | 5/2022 | Chadwick | ............ | A01K 69/08 43/102 |
| 2022/0141553 A1 * | 5/2022 | Liu | ................ | A01K 69/06 340/850 |
| 2022/0287285 A1 * | 9/2022 | Bajer | ................ | A01K 73/05 |
| 2022/0378026 A1 * | 12/2022 | Vincent | ................ | B63B 22/06 |
| 2023/0068755 A1 * | 3/2023 | Traeger | ................ | B63B 49/00 |
| 2023/0098899 A1 * | 3/2023 | Magnusson | ............... | B63C 7/26 441/9 |

FOREIGN PATENT DOCUMENTS

| | | | | |
|---|---|---|---|---|
| WO | WO-2005082138 A1 * | 9/2005 | ............. | A10K 69/00 |
| WO | WO-2017042785 A1 * | 3/2017 | | |
| WO | WO-2017042786 A1 * | 3/2017 | | |
| WO | WO-2020150819 A1 * | 7/2020 | ............. | G01S 19/14 |

* cited by examiner

SYSTEM, APPARATUS AND METHODS FOR CRAB HARVESTING

RELATED APPLICATIONS

This application claims priority to U.S. Provisional Application No. 62/854,764 filed May 30, 2019.

FIELD OF THE INVENTION

The field of this invention is for manufacturing and monitoring of improved crab pots and indicator systems to indicate when crabs have entered those pots.

BACKGROUND

The harvesting of crabs is economically important to the State of Oregon and to their stakeholders. See Oregon Dungeness Crab Fishery Bioeconomic Model: A Fishery Interactive Simulator Learning Tool Final Report, Version 5.7 published Mar. 2017 entitled "*Dungeness crab (Cancer magister) is usually Oregon's most valuable fishery*".

The design and manufacture of crab traps is somewhat dependent on the species of crabs, but all crab traps share common designs features. These design features consist of an enclosure for trapping the crab, one or more constricting entry holes for the crab to move into the enclosure, a bait area in the crab trap, a line connected to the crab trap, and a buoy connected to the line. After the crab moves through the constricting entry hole to obtain food in the bait area, the crab then cannot leave the trap as it is difficult for the crab to go back the way they entered in, which permanently traps the crab.

Prior art patents include:

| | | | |
|---|---|---|---|
| U.S. Pat. No. | 3,373,523 | Olafson | Mar. 19, 1968 |
| U.S. Pat. No. | 4,644,682 | Cloud | Feb. 24, 1987 |
| U.S. Pat. No. | 5,165,174 | Brown, Jr. | Nov. 24, 1992 |
| U.S. Pat. No. | 5,478,273 | Ives | Dec. 26, 1995 |
| U.S. Pat. No. | 5,771,627 | Mattson | Jun. 30, 1998 |
| U.S. Pat. No. | 6,550,180 | Le | Apr. 22, 2003 |
| U.S. Pat. No. | 8,938,908 | Havens | Jan. 27, 2015 |
| U.S. Pat. No. | 9,091,550 | Smith | Jul. 28, 2015 |
| U.S. Pat. No. | 10,227,112 | Pedersen | Mar. 12, 2019 |
| U.S. Pat. Pub | 2014/0305026 | Pemberton | Oct. 16, 2014 |
| U.S. Pat. Pub | 2016/0340001 | Welch | Nov. 24, 2016 |

SUMMARY

The present invention is directed to an improved crab trap adapted to be lowered in a body of water and to rest on a floor of a body of water to harvest crabs. The crab trap includes a marine counter device connected to a plurality of transmitters. The marine counter device attached to one or more entrances of the crab trap, so as to register a count of the number of crabs entering the crab trap and the plurality of transmitters adapted to transmit the information of reaching a preset limit for crab entry.

In the preferred embodiments there is an improved tabulating crab trap that has the line connected to the tabulating crab pot where the crab pot has one or more crab entrances, the entrances having a crab entering detector that is capable of detecting a single entry of the crab into the crab pot. The crab entering detector then tabulates each crab and then when a threshold is reached a floatable beacon is launched from the crab trap. This floatable beacon, when it reaches the surface, indicates the number of crabs by a radio transmitter, by light indicator, sound indicator, and the like. In one implementation, the floatable beacon is connected to a standard cellular network that transmits the number of crabs, the buoy location, and other information to a computerized system that calculates if this particular crab pot should be pulled.

In another embodiment, a system or method may be implemented for the counting of crabs in a crab trap where the crab fisherman takes one or more of these steps: 1) setting a crab pot with a crab entering detector connected to an entrance of the crab pot; 2) detecting the entry of a crab into the crab pot with the crab entering detector; 3) tabulating the total number of crabs passing through the entry of a crab into the crab pot; 4) evaluating if the total number crabs that have entered through the entrance of the crab pot has met a certain threshold; and 5) releasing a floating indicator when the reaches a threshold count is met.

Likewise another embodiment involves implementing a system for where one or more crab pots are pulled from area in a body of water that has the sampling of one or more crab pot buoys within an area of the body of water; measuring the number of crabs in the crab pot associate with the crab pot buoy via a floating indicator; inputting the number of crabs and the geographic location of the crab pot buoy into computerized system; calculating with the computerized system by accepting the anticipated selling price of crab harvested within the area of body of water; and determining if the crab pot should be pulled by comparing the cost to visit the area in a body of water with the expected profit from the area of body of water.

It should be understood that the summary above is provided to introduce in simplified form a selection of examples that are further described in the detailed description. It is not meant to identify key or essential features of any claimed subject matter that may later claim priority to the present description. Furthermore, the scope of any such claimed subject matter would not be limited to implementations that solve any disadvantages noted above or herein contained.

BRIEF DESCRIPTION OF THE DRAWINGS

Many aspects of the present invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

Partial List of Reference Characters

Figure 1:
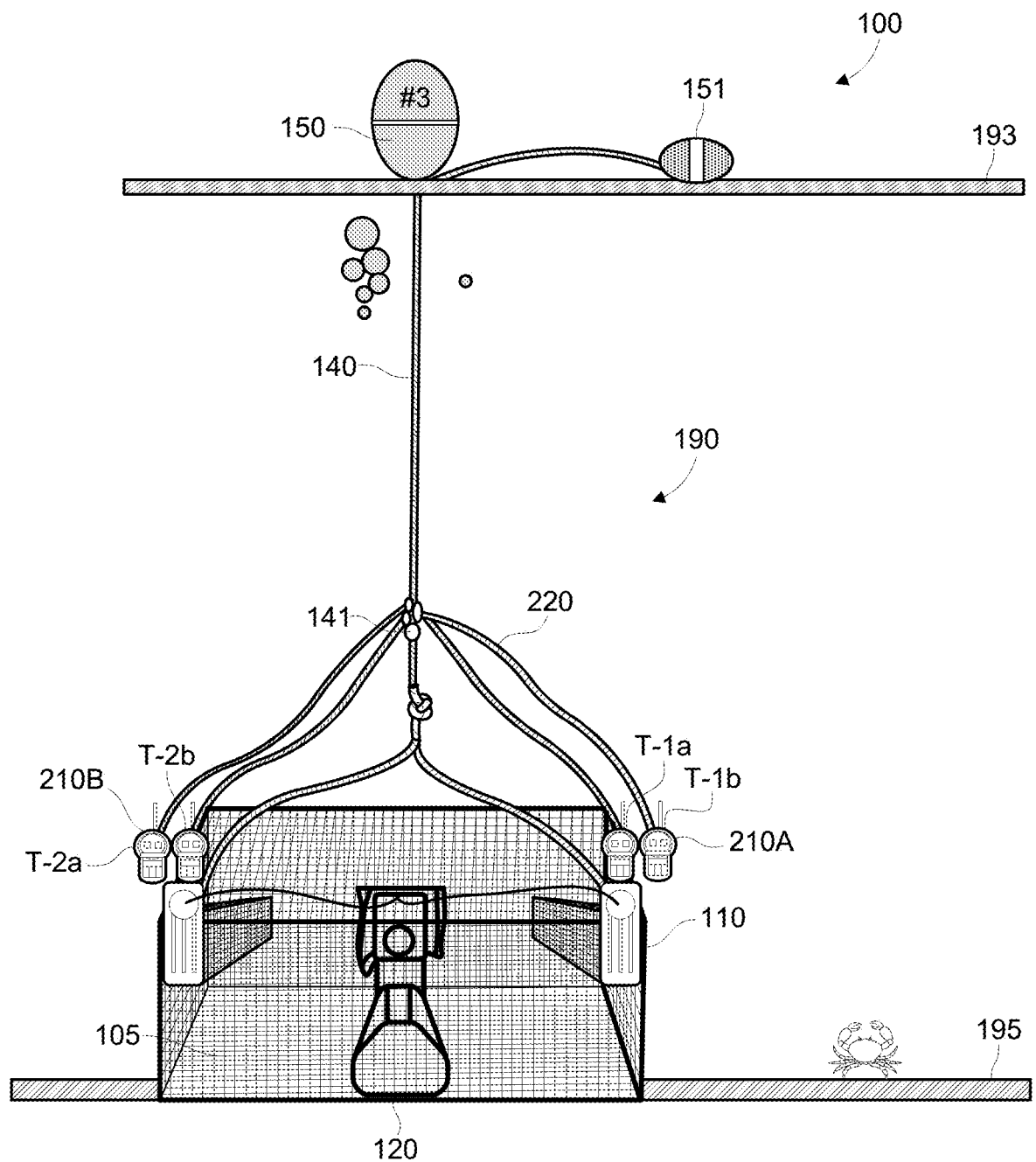
FIG. 1 is a side view of the improved crab pot system.

110: Counter device
120: Crab pot entrance

210A/B: Transmitters
140: Buoy line
150: Buoy
151: Trail buoy
190: Body of water
193: Water surface
195: Sea floor
310: Case
320: Plate
330A/B/C: First/Second/Third tab
340: Push arm
345: Pull arm
350: Shaft/Cylinder
355: Teeth
360: Knob

DETAILED DESCRIPTION

Turning to the drawings, where like reference numerals represent like parts throughout the various drawing figures, FIG. 1-5 described apparatus and methods for an improved crab pot.

Referring to FIG. 1, a side view 100 of a crab pot 105 suspended in a water body 190 for harvesting crabs is illustrated. The crab pot 105 is equipped with one or more entrances 120 for the entry of crabs and each entrance 120 is attached to a marine counter 110. Each marine counter 110 can be equipped with at least three transmitters 210A/B. In an exemplary system illustrated in FIG. 1, each marine counter unit is connected to two transmitters T-1a, T-1b and T-2a, and T-2b.

In another example, the marine counter 110 is set to receive a desired number of crabs in preferably sets of twenty-five crabs per transmitter 210A/B. As each transmitter 210A/B reaches up to twenty-five count, the transmitter 210A/B is immediately released from the unit and the transmitter travels via connection 141 up the buoy line 140 to the surface 193 of the body of water 190, where the transmitter 210A/B sends out a signal to a receiver regarding at least the receiving of twenty-five crabs.

Figure 2:
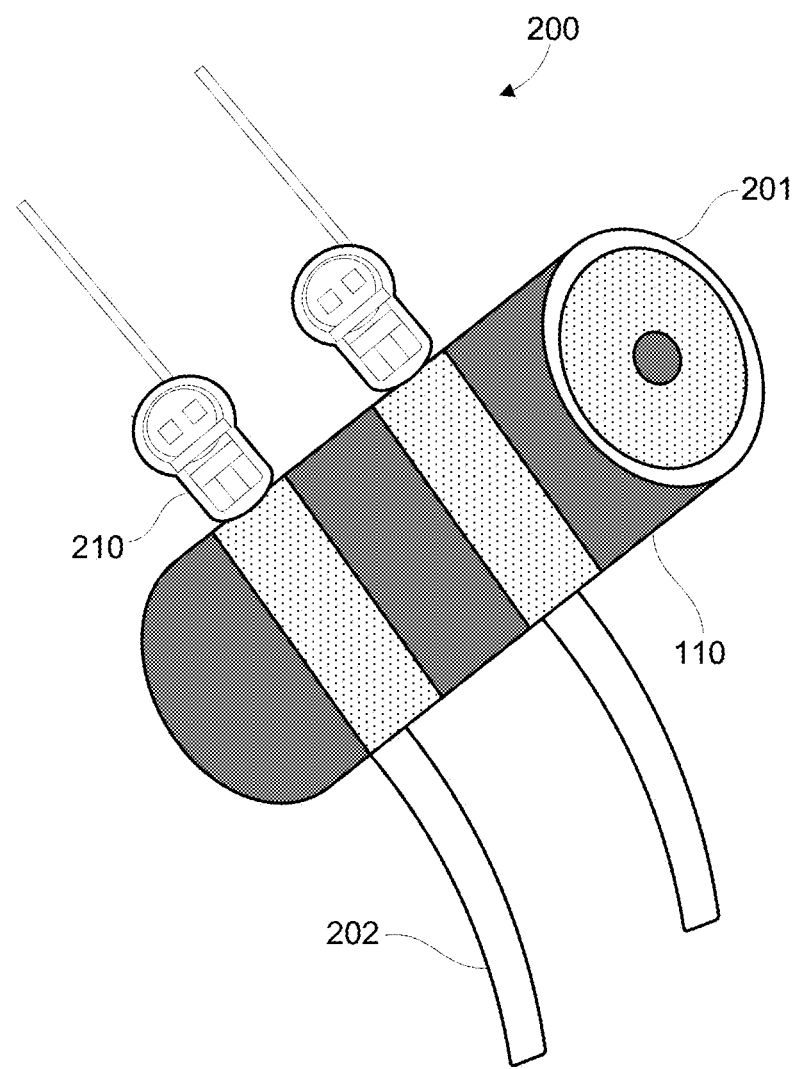
FIG. 2 is a top view of the latching/counting mechanism.

Referring to FIG. 2, a diagrammatic view 200 of the marine counter 110 is as illustrated. A cylinder unit 201 that is adapted to mount to an entrance 120 of the crab pot 105 keeping track of the number of times the arms 202 have been engaged. The arms 202 count as a crab passes through. The transmitter 210A/B is released when the cylinder 201 registers the pre-set number of clicks or the number of crabs that have passed into the pot.

Figure 3A:
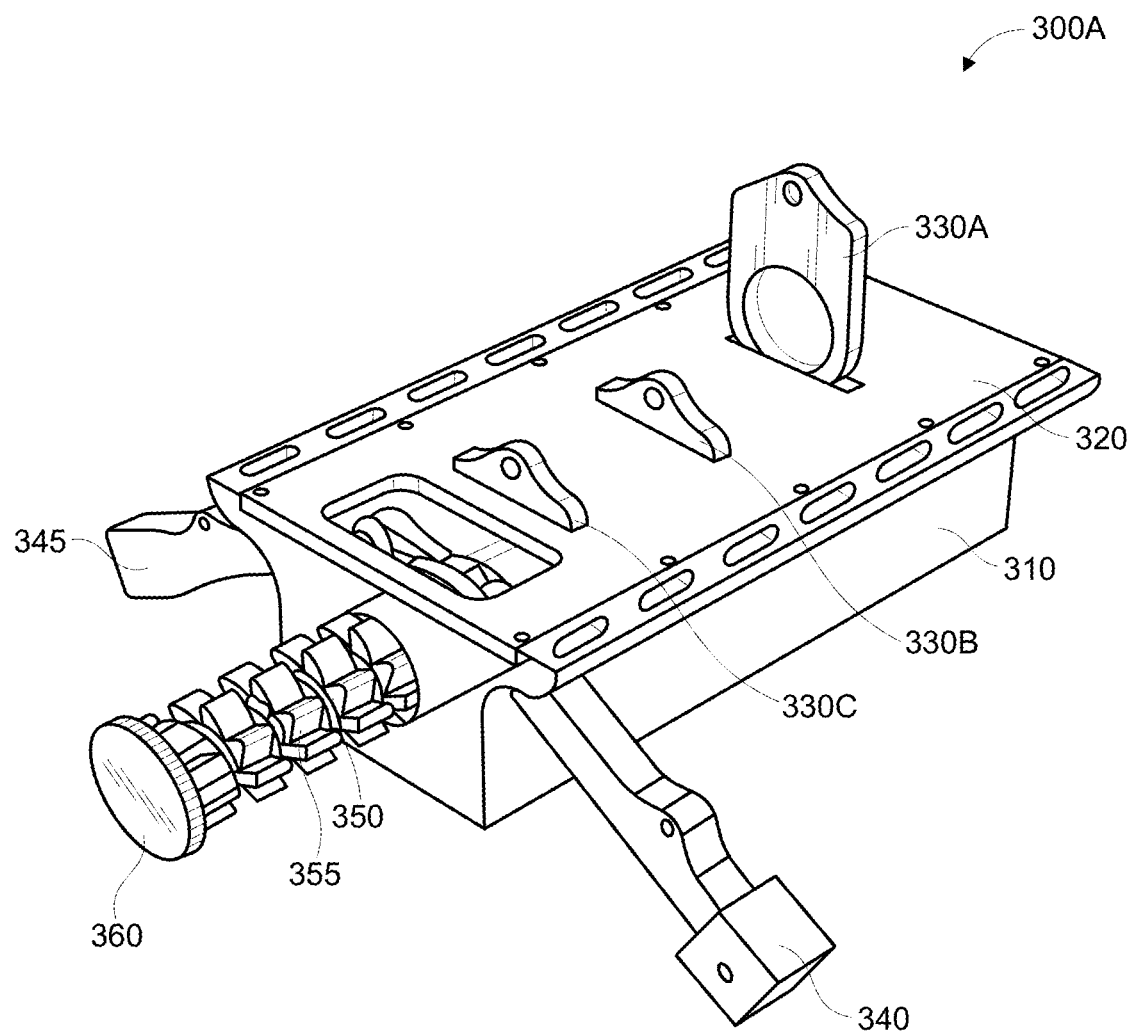
FIG. 3A is a perspective view of counter device.
Figure 3B:
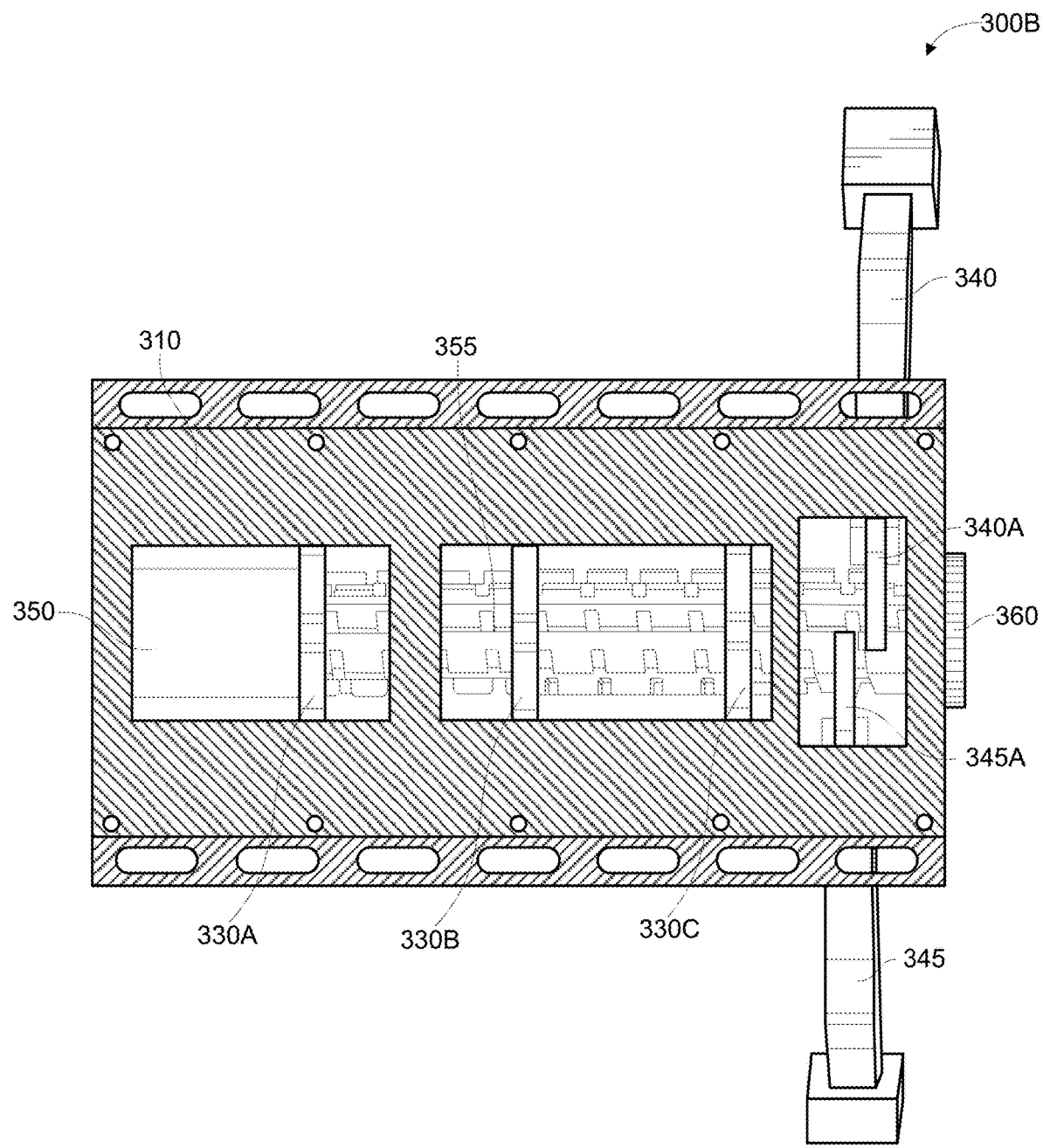
FIG. 3B is a top cross-sectional view of counter device.

Referring to FIG. 3A and FIG. 3B, a perspective view 300A and a top view 300B respectively of a marine counter 110 in a case 310 is illustrated. The case 310 hosts the counting mechanism including a shaft/cylinder 350 with pinwheel type teeth structures 355 along the outer cylindrical surface and terminating in a knob 360 protruding outside of the case 310. The shaft/cylinder 350 also engages a pair of arms, a push arm 340 and a pull arm 345 at a first end of the case 360. The case 310 is covered with a cover plate 320 with openings to accommodate a first tab 330A located towards the second end of the case 310. A second tab 330B located at the middle of the case 330. A third tab 330C located towards the first end of the case 310. The operation of the marine counter 110 is described hereafter. When a crab enters the crab pot 105, its body engages with either pull arm 345 or push arm 340 in FIG. 3A dependent on how it enters the crab pot 105 via the entrance 320. The crab's motion causes pull arm 345 or push arm 340 to exert a force on the push or pull arm connector 345A or 340A, respectively which engages with the teeth 355, best seen in FIG. 3C which are slightly angled relative to shaft, as best seen in FIG. 3B, i.e. pinwheel type teeth structure 355. When the shaft 350 rotates it also moves in an axial direction relative to shaft and after the shaft 350 has rotated the equivalent of the set number of crabs, twenty-five for example, the shaft 350 has moved a linear distance that allows for the release of the transmitter 210A/B which is attached to the tab 330A in FIG. 3A because the shaft is no longer retaining the tab 330A and the buoyancy of the transmitter causes the transmitter to ascend to the surface 193 of the water body 190.

Figure 3C:
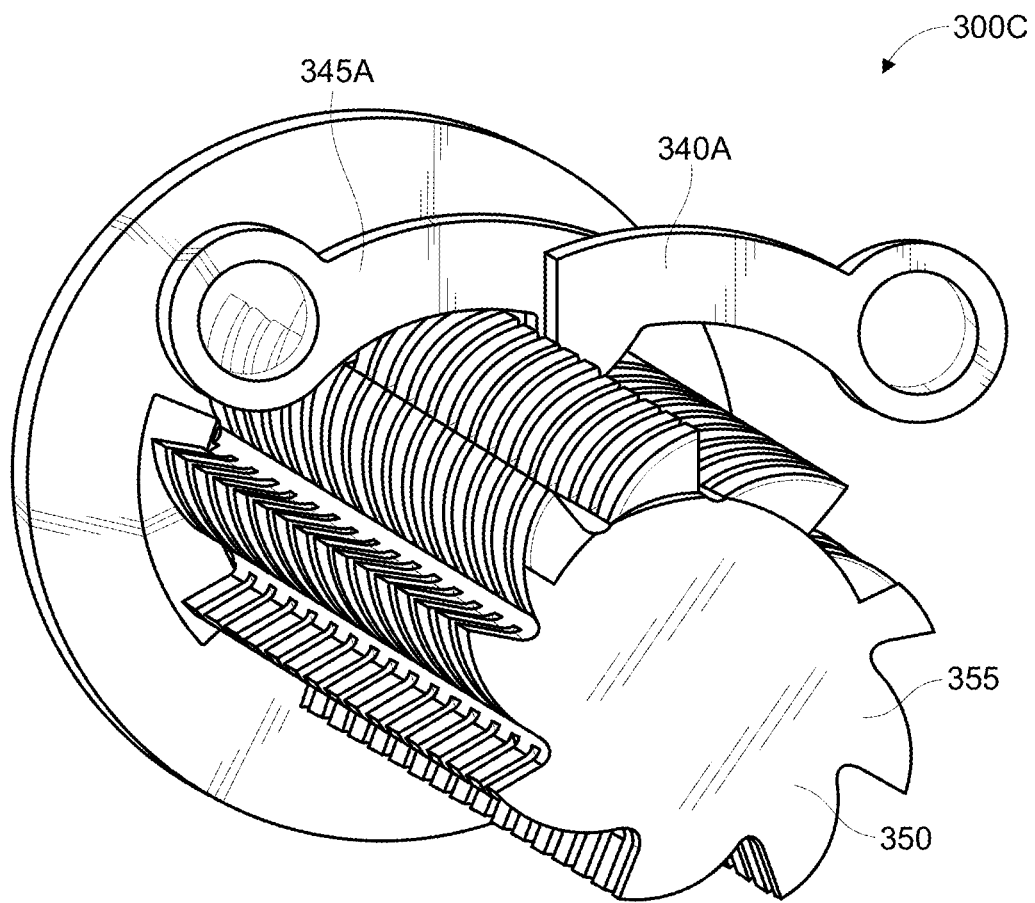
FIG. 3C is a partial view of isolated shaft of the counter device.

Referring to FIG. 3C, a partial perspective view 300C of an isolated shaft is illustrated. The shaft 350 with pinwheel type teeth structures 355 running along the length of the outer cylindrical surface engages a pair of arm connectors 340A and 345A connecting to the push arm 340 and the pull arm 345 respectively.

Figure 3D:
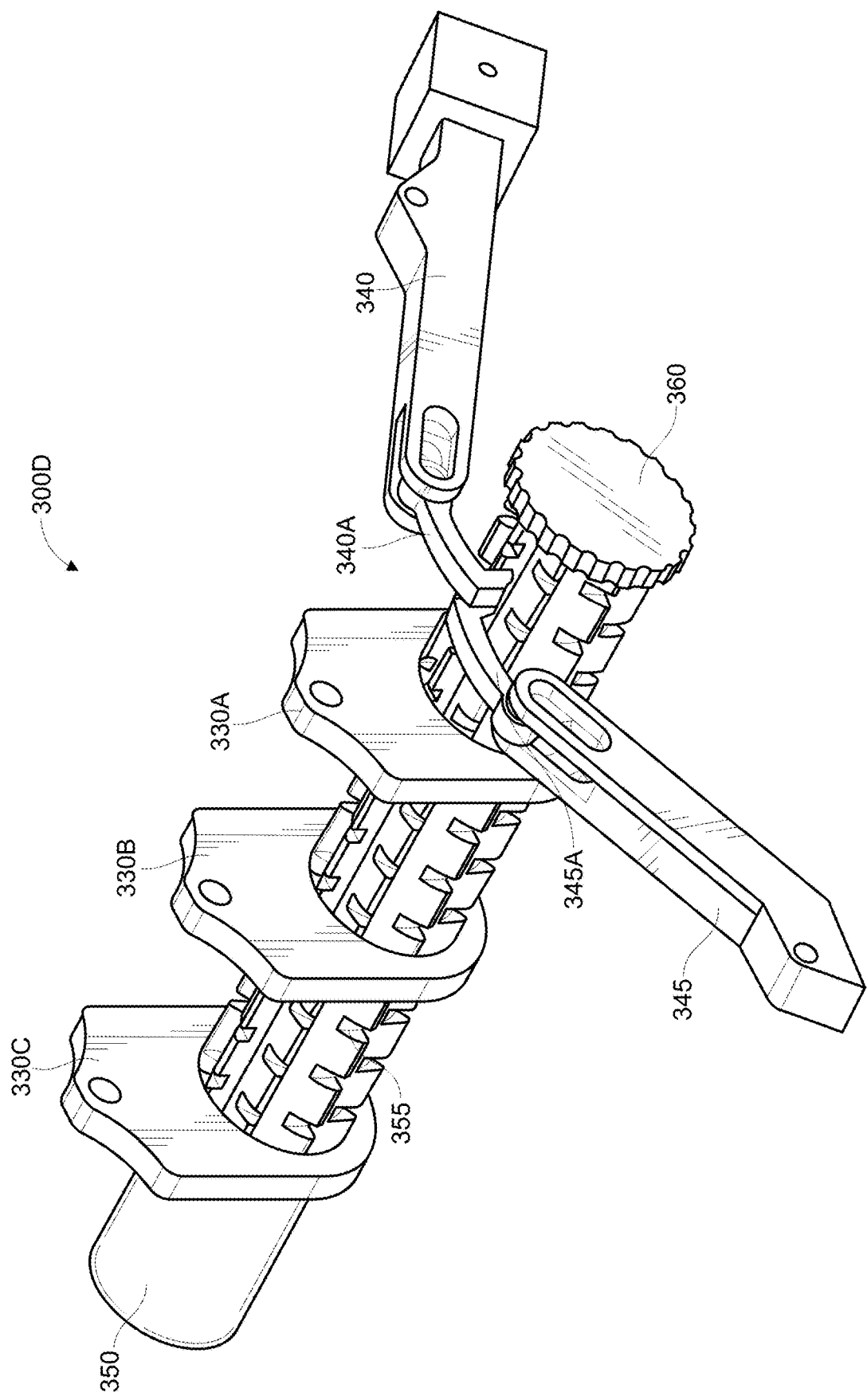
FIG. 3D is another partial view of isolated shaft of the counter device.

Referring to FIG. 3D, a partial perspective view 300D of an isolated shaft 350 with push arm connector 340A, push arm 340, pull arm connector 345A and the pull arm 345 and the first tab 330A, second tab 330B and third tab 330C is illustrated. The first tab 330A, second tab 330B and third tab 330C communicatively move in response to the movement of the central shaft 350 upon the push arm 340/pull arm 345 moving in response to the entry of one or more crabs into the crab pot 105.

Figure 3E:
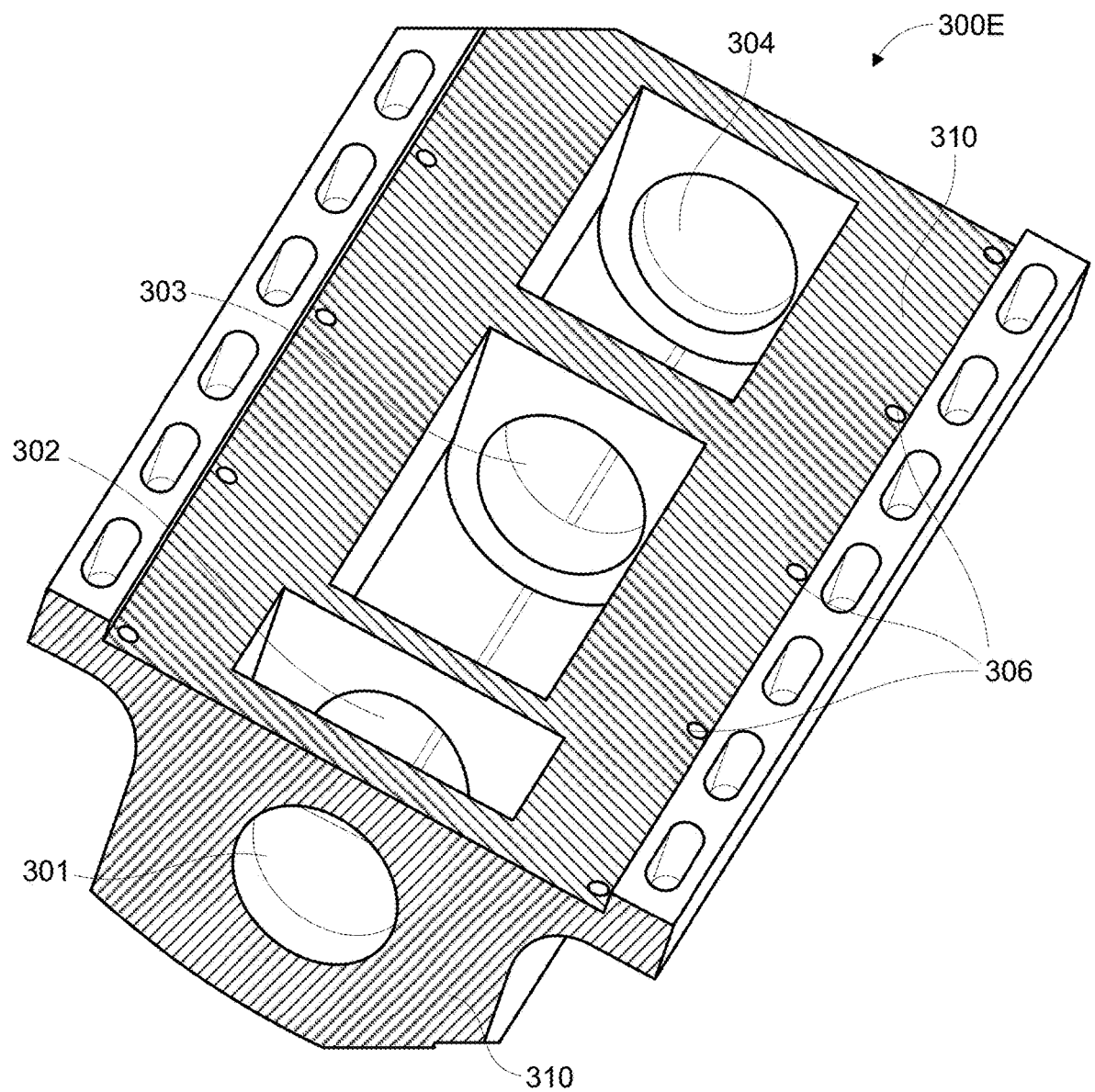
FIG. 3E is a partial view of an isolated case.

Referring to FIG. 3E, a partial perspective view 300E of an isolated case 310 of the marine counter 110 is illustrated. The case 310 has an aperture 301 at a first end of the case to make way for the central shaft 350. Further concentric apertures 302/303/304 make way for the shaft 350 through the first end of case to the second end of the case 310. A series of apertures 306 on both ends of the top surface of the case assist in receiving fastening accessories to accommodate the case cover plate 320.

While the counting mechanism illustrated in FIG. 3A-3E is a mechanical latching mechanism, the control of transmitters may be accomplished by detecting the entrance of crabs using other sensing techniques, such as electrical switches connected to the doors, optical sensors that indicate when the crabs have crawled into the pot, photoelectric or photoimaging cameras that take and process an image of the entering crab, electrical impedance detectors that indicate when a crab has entered to pot.

Figure 4A:
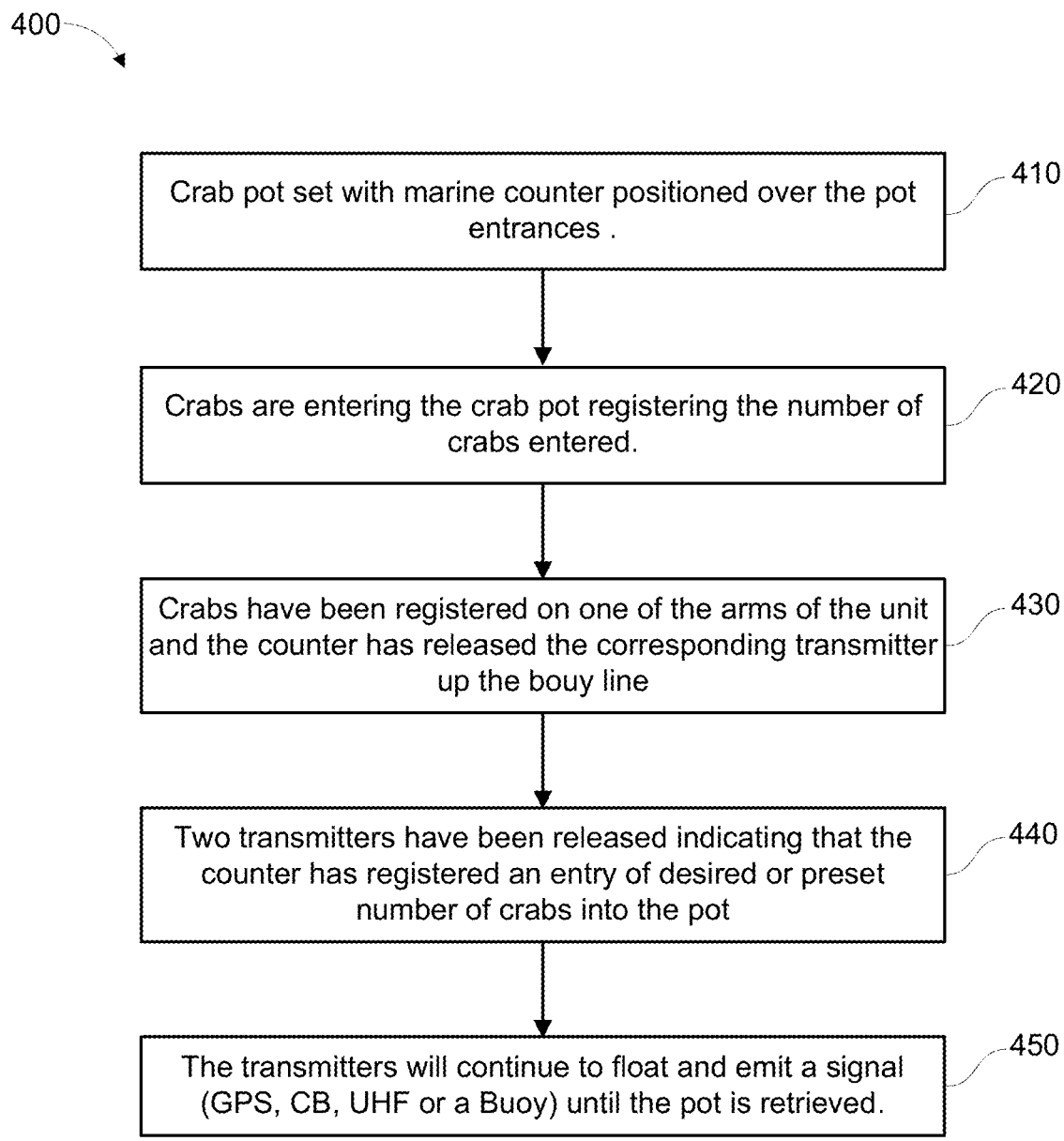
FIG. 4A is a flow chart for a method of use for the improved crab pot system.

Referring to FIG. 4A, an exemplary flow chart or method 400 for the use of the improved crab pot in a body of water is illustrated. A first step 410 includes, setting a crab pot with a marine counter positioned over the crab pot entrance in the body of water. A second step 420 includes, entering of one or more crabs into the marine counter. A third step 430 incudes, registering a number count of the crabs entering the crab pot, by the rotation of the shaft 350. A fourth step 440, includes releasing of a transmitter attached to the crab pot via a transmitter line upon reaching a preset limit for the number count of the crabs entering the crab pot. Finally, the fifth step 450 includes, floating of the transmitter on a surface of the body of water to communicate (GPS, CB, UHF or a Buoy which may be an indicator float having written text thereon) the reaching of a number count of the crabs entered in the crab pot.

Figure 4B:
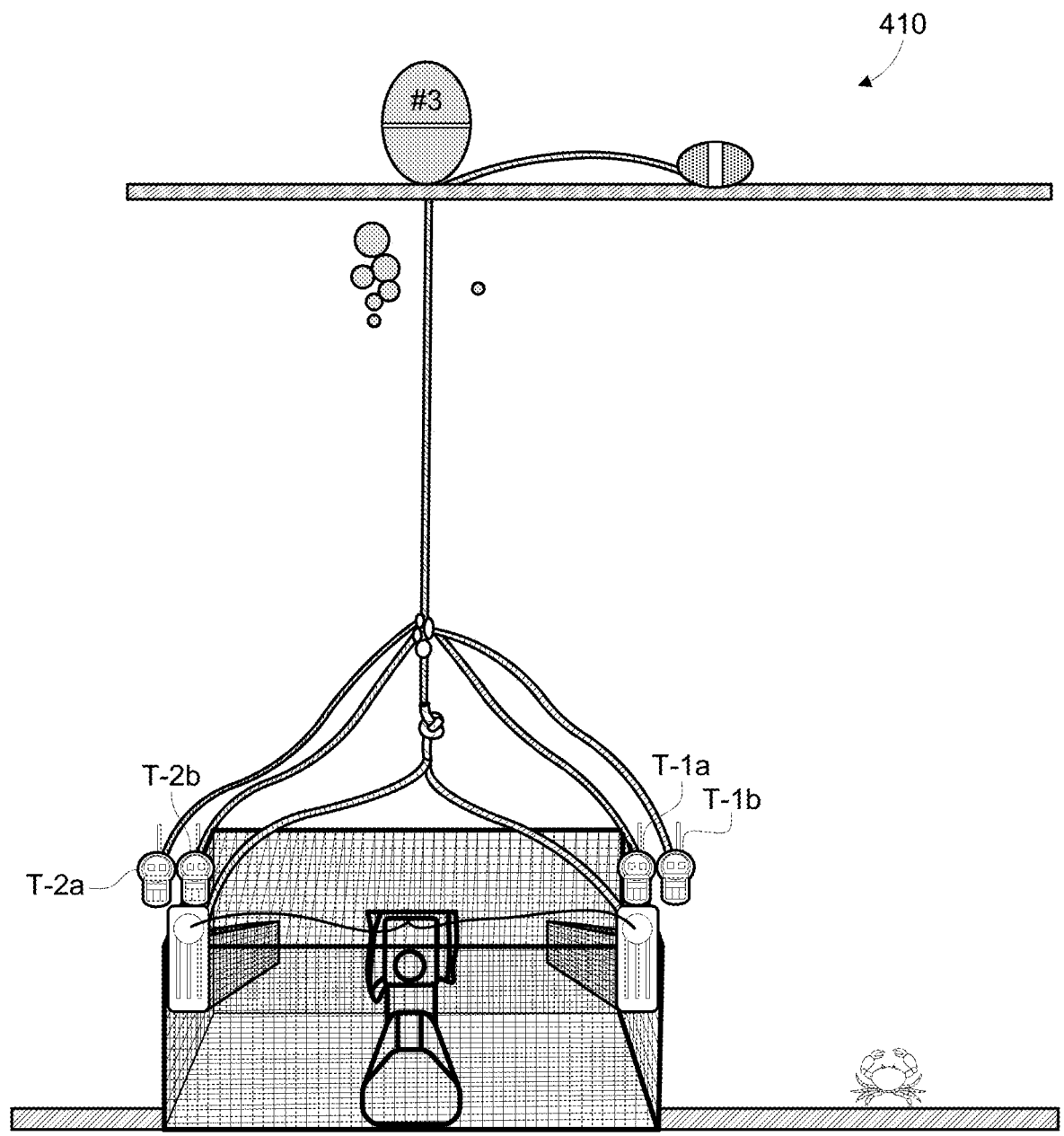
FIG. 4B-4E is a schematic diagram of the improved crab pot system.

Referring to FIG. 4B, represents a diagrammatic view of step 410, a crab pot is suspended in a water body for harvesting crabs. The crab pot is equipped with one or more entrances for the entry of crabs and each entrance is attached to a marine counter. Each marine counter is equipped with at least three transmitters. In an exemplary system illustrated in FIG. 4A, each marine counter unit is connected to two transmitters. The marine counter is set to receive up to hundred crab units in total in sets of twenty-five crabs per transmitter. As each transmitter reaches up to twenty-five count, the transmitter is immediately released from the unit and the transmitter travels up the buoy line to the surfaces of the body of water, where the transmitter sends out a signal to the receiver regarding at least the receiving of twenty-five crabs.

Figure 4C:
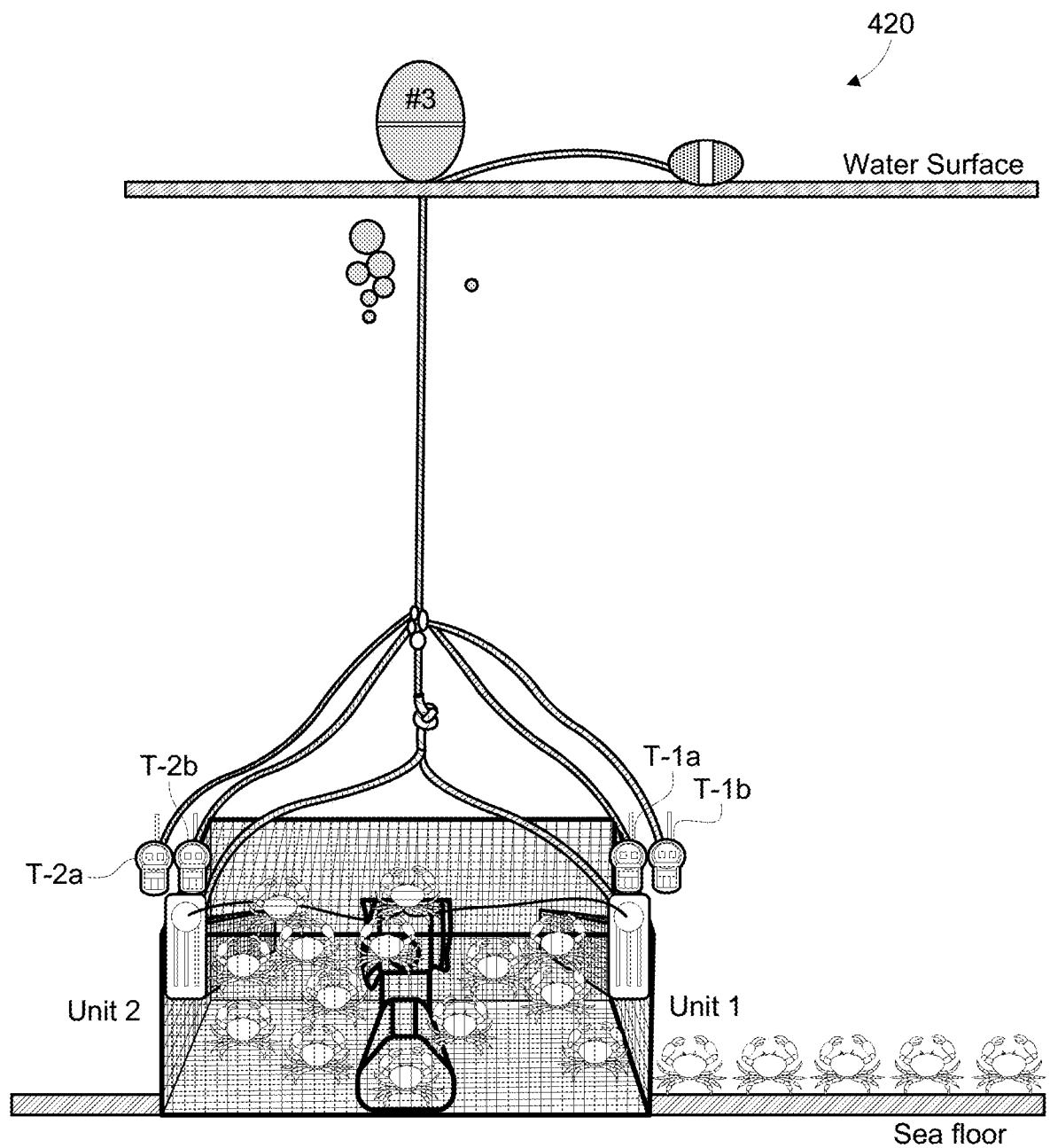

As illustrated in FIG. 4C, represents a diagrammatic view of step 420, one or more crabs having entered the crab pot through the marine counter, and the marine counter having registered the number of crabs that have entered the crab pot but has not yet met the pre-set number of twenty-five crabs so the transmitters remain in place.

Figure 4D:
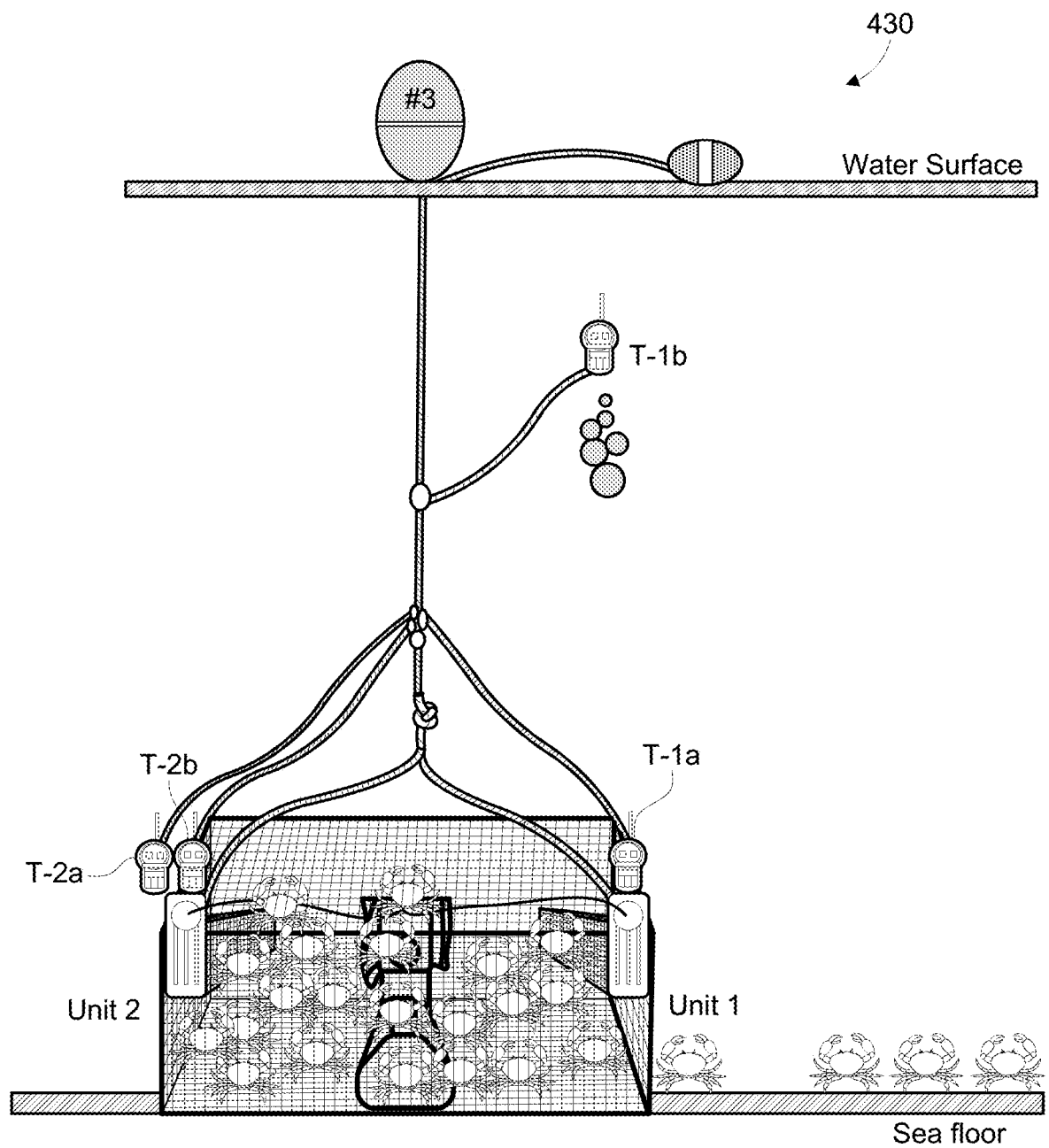

Referring to FIG. 4D, represents a diagrammatic view of step 430, a twenty-five-crab limit for one of the transmitters is reached, and the marine counter has released the corresponding transmitter up the buoy line and to the surface of the water body to begin broadcasting to the receiver.

Figure 4E:
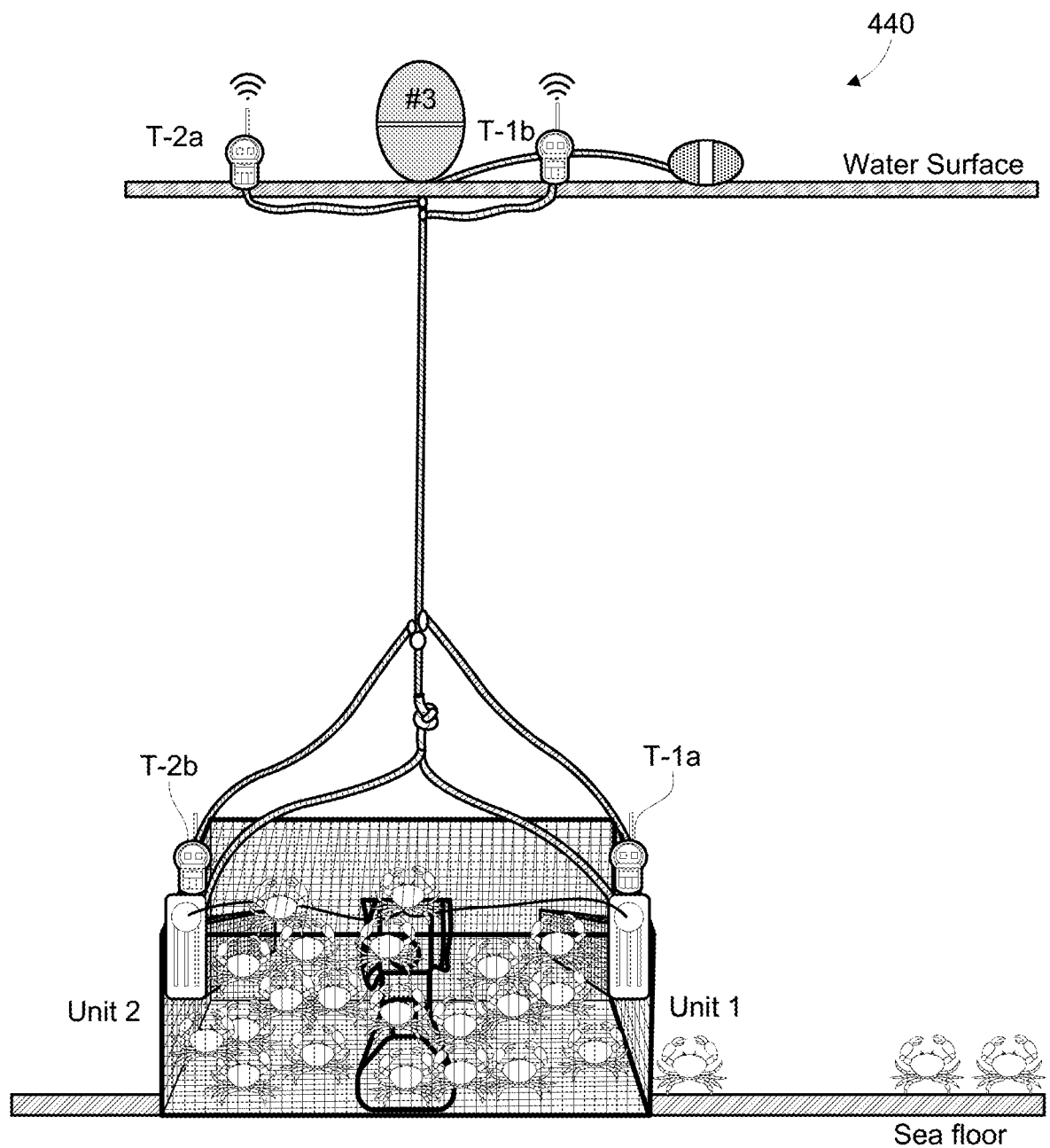

Referring to FIG. 4E, represents a diagrammatic view of step 440, two of the transmitters are illustrated as floating on the surface of the body of water as their corresponding counters each have registered an entry of twenty-five crabs through the marine counter. A signal is being sent to the receiver from each transmitter with a unique code, which corresponds to the identity of each counter and each transmitter.

Figure 4F:
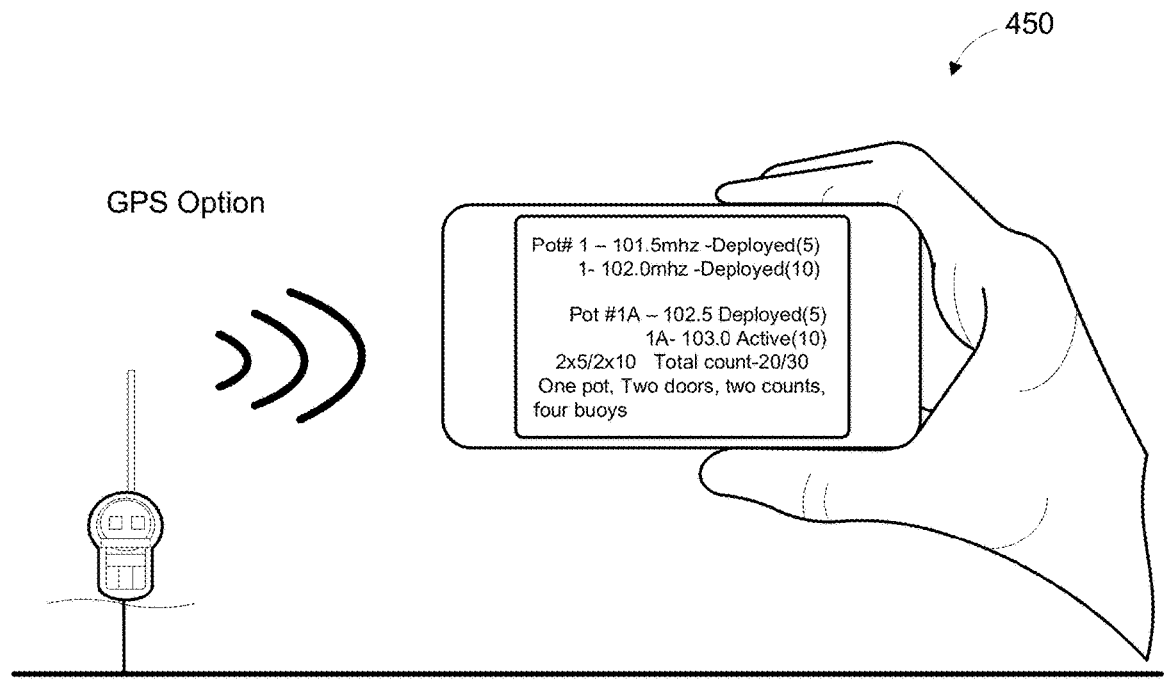
FIG. 4F-4H are schematic diagrams of the improved crab pot system.
Figure 4G:
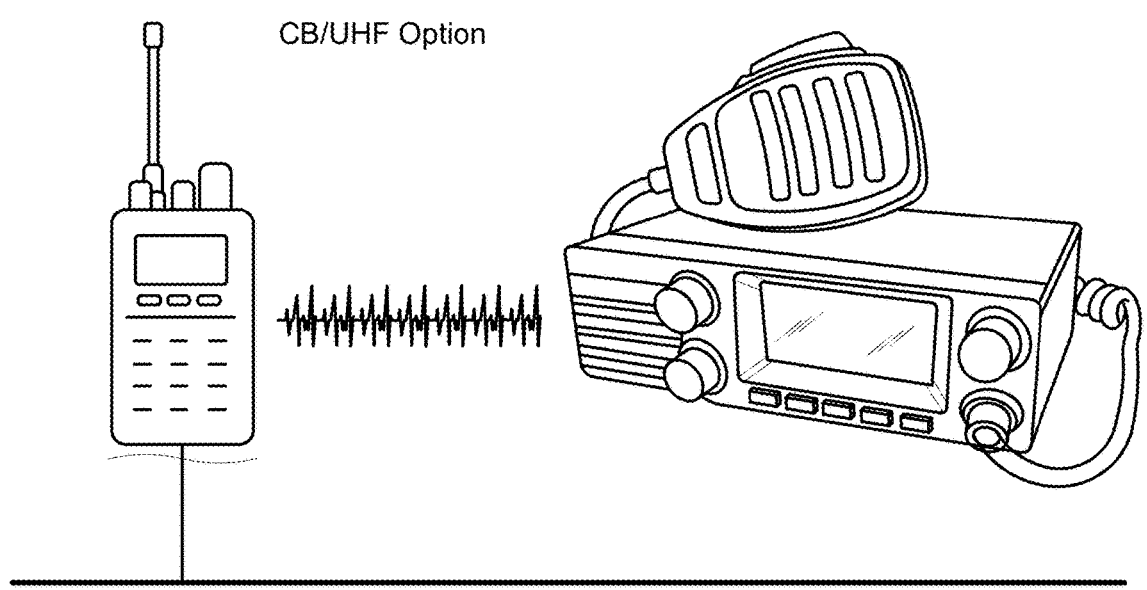
Figure 4H:
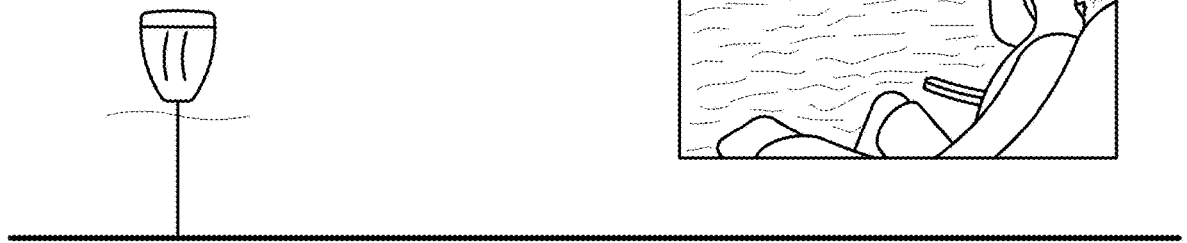
Figure 5A:
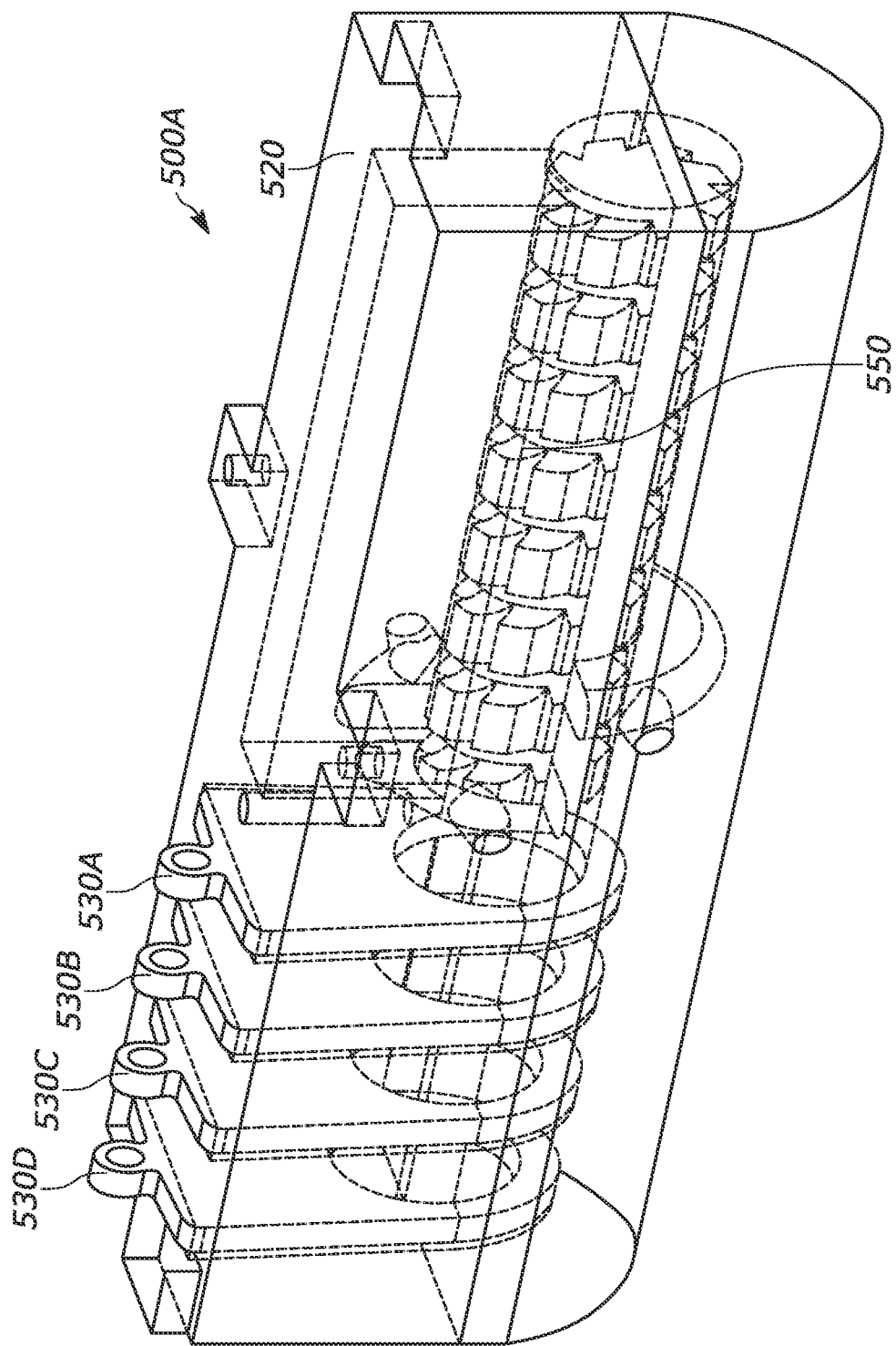
FIG. 5A-5D are mechanical diagrams of a variation of the counting device.
Figure 5B:
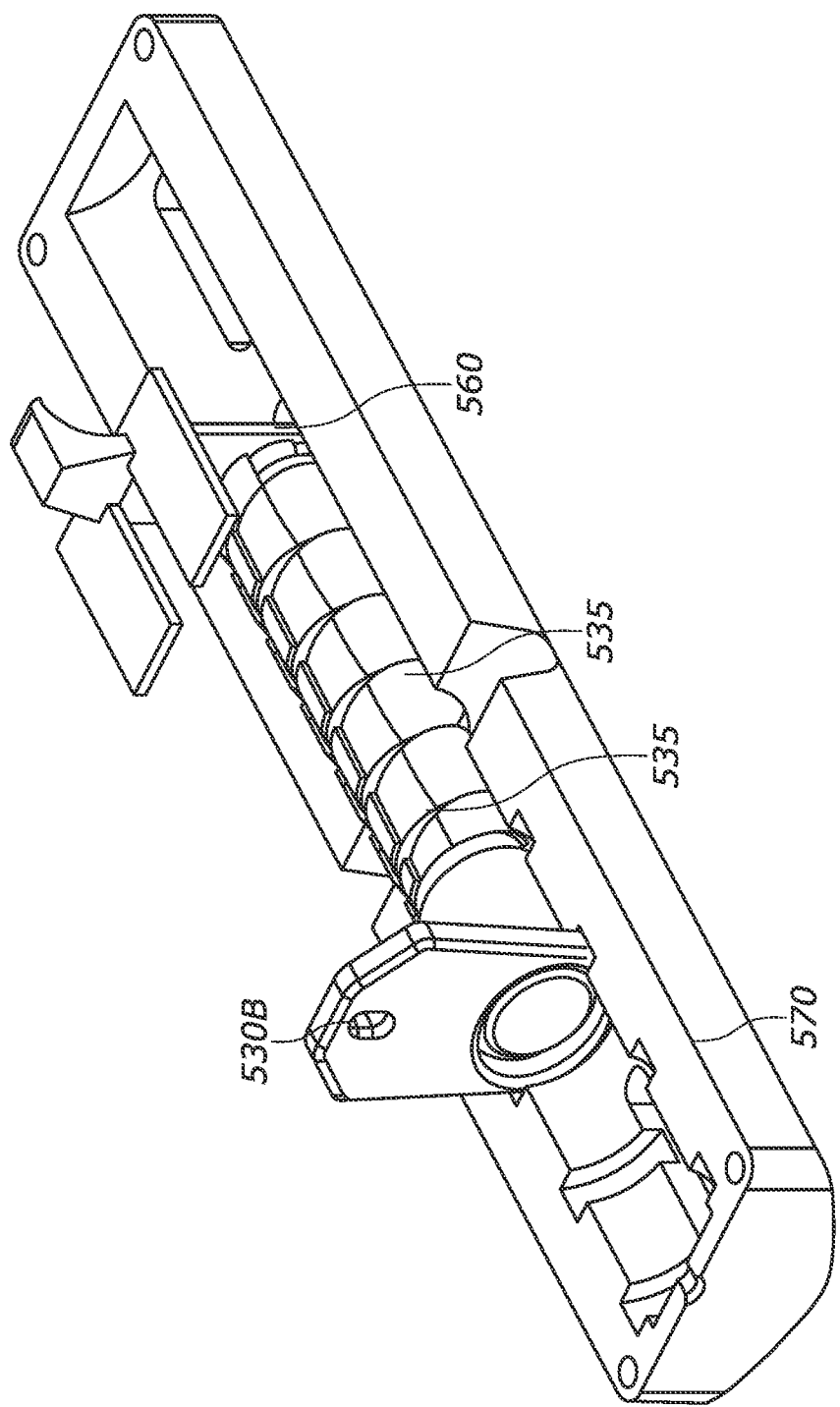
Figure 5C:
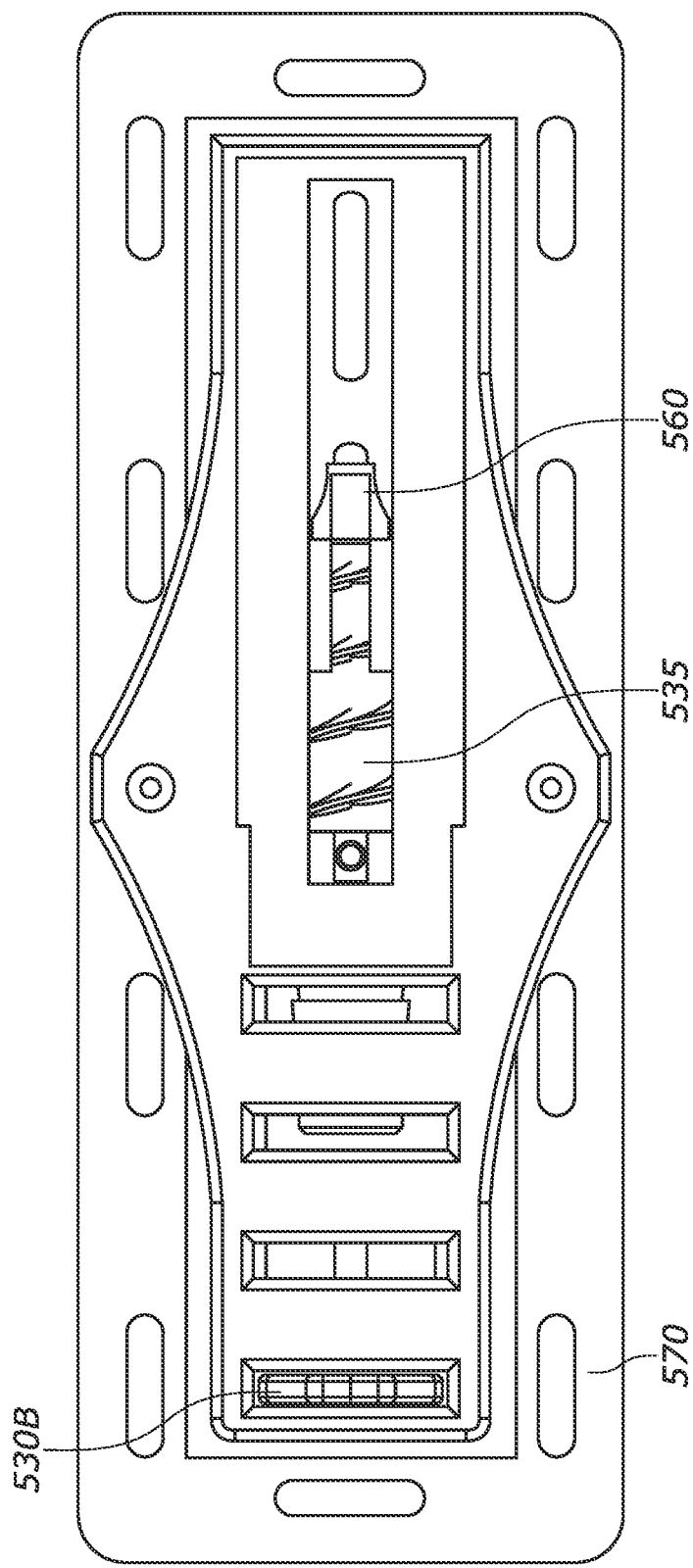
Figure 5D:
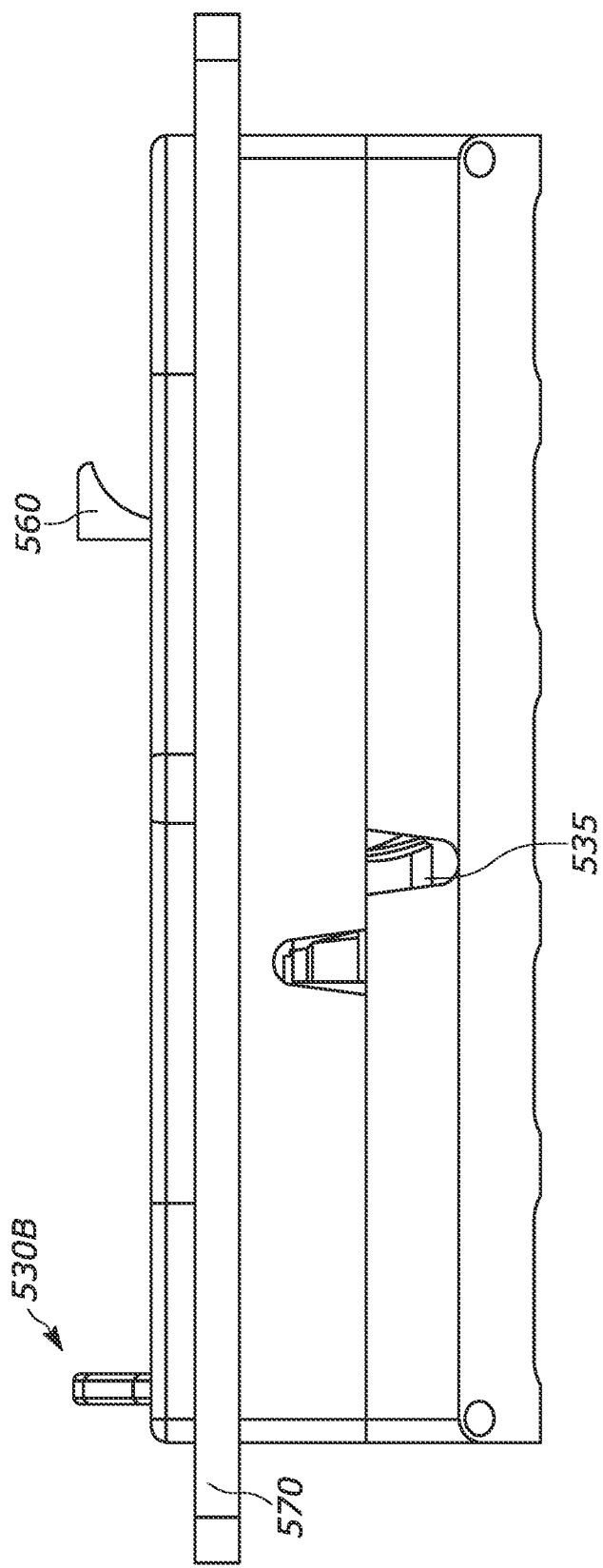

Referring to FIG. 4F, 4G, and 4H, represents a diagrammatic view of step 450, the transmitters floating on the surface of the body of water continue to emit a signal until the crab pot is retrieved from the water body. The transmitters can be GPS, CB/UHF, or a buoy that can be visually seen from a short distance. The GPS signal would be ideal for commercial crabbers over a vast area of fishing. The CB signal would be ideal for fisherman within radio signal range and the buoy signal would be suited for reception of signal from a dock. For example, a screenshot on an electronic device would display the following information as illustrated in FIG. 9C, crab pot #1 would be 101.5 mhz—deployed (5), 1-102.0 mhz—Deployed (10). Pot #1A—102.5 Deployed (5) 1A—103.0 Active (10). 2×5/2×10 Total Count—$^{20}/_{30}$; one pot, two doors, two counts and four buoys.

Now referring to: FIG. 5A, FIG. 5B, 5C, and 5D, that depict an alternate configuration of the marine counter 110.

Referring to FIG. 5A-5D showing a side view 500A respectively of a marine counter 110. The case hosts the counting mechanism with a shaft/cylinder 550 with pinwheel type teeth structures along the outer cylindrical surface. The shaft/cylinder 550 also engages a pair of arms, a push arm and a pull arm at a first end of the case 560.

The instant invention may be embodied in other forms or carried out in other ways without departing from the spirit or essential characteristics thereof. The present disclosure is therefore to be considered as in all respects illustrative and not restrictive, the scope of the invention being indicated by the appended claims, and all equivalency are intended to be embraced therein. One of ordinary skill in the art would be able to recognize equivalent embodiments of the instant invention and be able to practice such embodiments using the teaching of the instant disclosure and only routine experimentation.

What is claimed is:

1. A tabulating crab pot system comprising:
a line having a buoy end and a tethering end, the tethering end tethered to a tabulating crab pot;
the tabulating crab pot further comprising: an enclosure defining an interior for trapping crabs therein; and one or more entrances leading into the interior of the enclosure, each of the one or more entrances further comprising:
a crab entering detector, the crab entering detector comprising a push arm and a pull arm, each crab entering detector capable of detecting a single entry of the crab into the tabulating crab pot via the one or more entrances and generating an output in response to the single entry of the crab;
a crab counter comprising:
a case with a shaft disposed there within;
pinwheel type teeth structures are disposed along an exterior surface of the shaft and terminate at a knob, wherein the knob is located exterior to the case and the pinwheel type teeth structures are engaged with the push arm and the pull arm of the crab entering detector such that when the push arm or pull arm is moved by a crab entering the tabulating crab pot via the one or more entrances the output is generated by the movement of the push arm or pull arm which causes rotation of the shaft via the engagement of the pinwheel type teeth structures with the pull arm or push arm resulting in an axial movement of the shaft when a crab enters the tabulating crab pot;
at least one tab in communication with the shaft and located within the case and being attached to a floatable beacon, wherein after a threshold number of crabs has entered the tabulating crab pot resulting in both the rotation of the shaft and the axial movement of the shaft a linear distance such that the at least one tab is no longer in contact with the shaft and is released therefrom, the at least one tab floats out of the case with the floatable beacon upwards to a surface of a body of water indicating the number of crabs in the tabulating crab pot.

2. The tabulating crab pot according to claim 1 further comprising:
where the floatable beacon is an indicator float.

3. The tabulating crab pot according to claim 2 further comprising:
wherein the indicator float has written text thereon.

4. The tabulating crab pot according to claim 1 further comprising:
wherein the floatable crab beacon is a radio transmitter.

5. The tabulating crab pot according to claim 4, where the radio transmitter transmits the number of crabs that have been counted.

6. The tabulating crab pot according to claim 4, where the radio transmitter represents a number of crabs that have been counted and provides a visual indication thereof to the user.

* * * * *